US011567969B2

(12) United States Patent
Graefe et al.

(10) Patent No.: US 11,567,969 B2
(45) Date of Patent: Jan. 31, 2023

(54) UNBALANCED PARTITIONING OF DATABASE FOR APPLICATION DATA

(71) Applicant: SAP SE, Walldorf (DE)

(72) Inventors: Gerrit Graefe, Walldorf (DE);
Friedrich Keller, Karlsruhe (DE);
Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 355 days.

(21) Appl. No.: 15/991,115

(22) Filed: May 29, 2018

(65) Prior Publication Data
US 2019/0370382 A1    Dec. 5, 2019

(51) Int. Cl.
*G06F 16/00*    (2019.01)
*G06F 7/00*    (2006.01)
*G06F 16/27*    (2019.01)
*G06F 3/06*    (2006.01)
*G06F 9/50*    (2006.01)
*G06F 16/22*    (2019.01)

(52) U.S. Cl.
CPC .......... *G06F 16/278* (2019.01); *G06F 3/0644* (2013.01); *G06F 9/5061* (2013.01); *G06F 16/2282* (2019.01)

(58) Field of Classification Search
CPC .. G06F 16/2282; G06F 16/278; G06F 3/0644; G06F 9/5061
USPC ...................................................... 707/737
See application file for complete search history.

(56) References Cited

U.S. PATENT DOCUMENTS

| 10,789,273 | B1* | 9/2020 | Bhadoriya | ............ G06F 16/258 |
| 2014/0372486 | A1* | 12/2014 | Bose | ...................... G06F 16/27 707/792 |
| 2016/0026667 | A1* | 1/2016 | Mukherjee | ............ G06F 3/0679 707/714 |
| 2017/0103094 | A1* | 4/2017 | Hu | ........................ G06F 16/221 |
| 2017/0300490 | A1* | 10/2017 | Kachemir | .................. G06F 7/24 |
| 2017/0316224 | A1* | 11/2017 | Beckman | ............ G06F 21/6227 |
| 2017/0322996 | A1* | 11/2017 | Horowitz | .............. G06F 16/278 |
| 2018/0246950 | A1* | 8/2018 | Arye | ................... G06F 16/2477 |
| 2018/0278578 | A1* | 9/2018 | Johnsen | .................. H04L 41/14 |

* cited by examiner

*Primary Examiner* — Raquel Perez-Arroyo
(74) *Attorney, Agent, or Firm* — Buckley, Maschoff & Talwalkar LLC

(57) ABSTRACT

Provided is a database system and method in which storage is partitioned in an unbalanced format for faster access. In one example, the method may include one or more of receiving a request to store a data record, identifying a partition from among a plurality of partitions of a database based on a shard identifier in the request, automatically determining a unique range of data identifiers designated to the partition from the plurality of partitions, respectively, based on an unbalanced partitioning, determining whether the data identifier is available within the unique range of data identifiers of the identified partition, and storing the data record at the identified partition in response to determining the data identifier is available. The unbalanced partitioning according to various embodiments reduces the partitions that need to be checked during a data insert/access operation of the database.

20 Claims, 10 Drawing Sheets

(Balanced Partitions)

(Balanced Partitions)

(Unbalanced Partitions)

(Unbalanced Partitions)

(Hybrid Partitioning)

UNBALANCED PARTITIONING OF DATABASE FOR APPLICATION DATA

BACKGROUND

Databases typically implement a shared nothing architecture or a shared everything architecture. In a shared nothing architecture, each server (e.g., database node, etc.) operates independently, and controls its own memory and disk resources. Data is partitioned among the servers, and a workload is distributed such that each server operates on its own data, without sharing hardware resources with other servers in the grid. In contrast, in a shared everything environment, all servers access the same shared data store, and each workload has access to the data store, as well as the computing resources of all servers in the grid. Typically, a shared nothing environment focuses on maximizing performance while a shared everything environment focuses on maximizing resource utilization. One drawback of a shared everything architecture is that data stored at more than one node must be duplicated at both nodes which creates redundant storage in the overall database. Another drawback is the overhead required to maintain the database integrity in case duplicated data is modified or deleted.

Because of these drawbacks, applications that run on single-node database systems are difficult to scale. For example, if an application running on a single-node database needs to be scaled to run on a multi-node database within a shared nothing architecture, application data should be equally distributed over the multiple database nodes in order to permit unlimited scalability while preventing overload. Furthermore, the database is typically not aware of a relationship between the storage of master data of the client application and the storage of documents (or other data sources) which are used to provide representations of the master data of the client application. As a result, when a database looks to perform an operation based on both the master data and the document data (e.g., a join, etc.) the database must perform a search based on every possible combination of database partitions to search for the master data and the documents. This search consumes significant resources of the database system. Therefore, what is needed is a more effective way of partitioning data for a shared nothing architecture.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
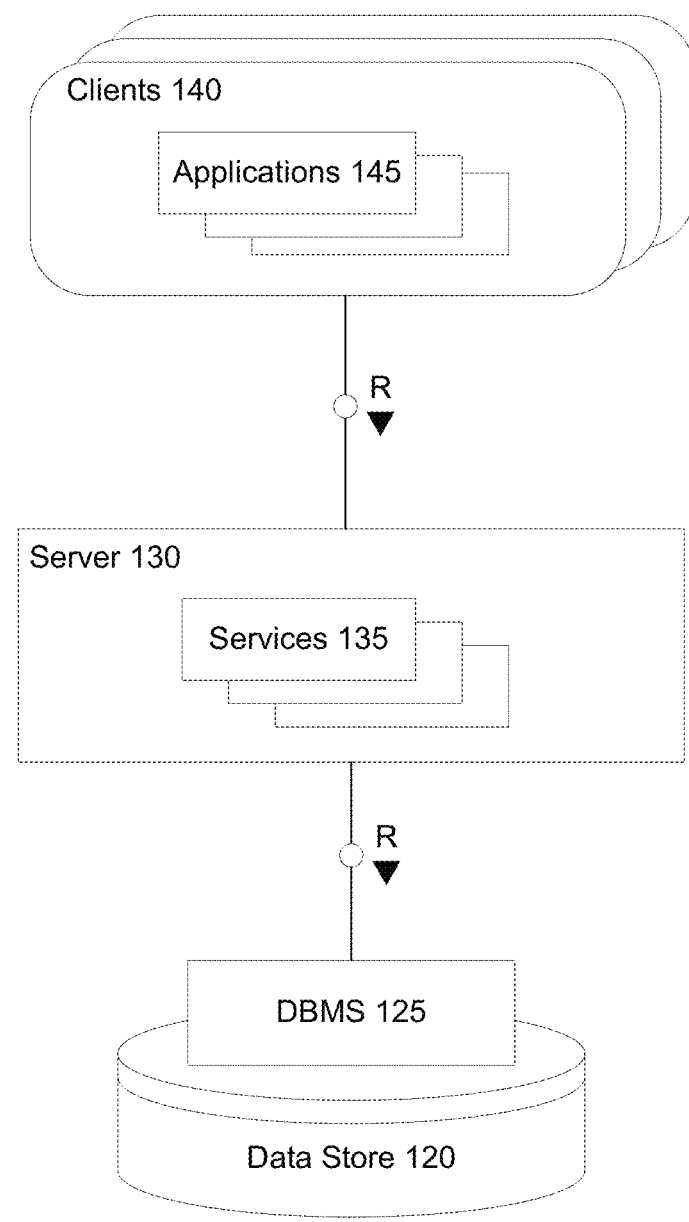
FIG. 1 is a diagram illustrating a database system architecture in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

FIG. 1 illustrates a system architecture of a database 110 in accordance with an example embodiment. It should be appreciated that the embodiments are not limited to architecture 110 or to a database architecture, however, FIG. 1 is shown for purposes of example. Referring to FIG. 1, the architecture 110 includes a data store 120, a database management system (DBMS) 125, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform various operations such as document/data storage, analytics, program execution, enterprise resource operations, business processes, report/document generation, and the like. In response, data may be output from the application 145 on the client 140 and stored by the data store 120. The application 145 may pass master data, document data, analytic data, and the like, based on the input to one of services 135. An SQL (Structured Query Language) script may be generated based on the request and forwarded to DBMS 125. DBMS 125 may execute the SQL script to return a result set based on data of data store 120, and the application 145 may create a report/visualization based on the result set. As another example, the data may be input by the user and provided directly from the application 145 to the DBMS 125 or the data store 120. According to various embodiments, the data store may include unbalanced partitioning as described herein and which is used to store documents created by an application 145.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL to manage and query data stored in data store 120. The DBMS 125 serves requests to query, retrieve, create, modify (update), and/or delete data from database files stored in data store 120, and also performs administrative and management functions. Such functions may include snapshot and backup management, indexing, optimization, garbage collection, and/or any other database functions that are or become known.

Server 130 may be separated from or closely integrated with DBMS 125. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 120. The application services can be used to expose the database data model, with its tables, views and database procedures, to clients 140. In addition to exposing the data model, server 130 may host system services such as a search service.

Data store 120 may comprise any query-responsive data source or sources that are or become known, including but not limited to a structured-query language (SQL) relational database management system. Data store 120 may include a relational database, a multi-dimensional database, an Extensible Markup Language (XML) document, or any other data storage system storing structured and/or unstructured data. The data within data store 120 may be distributed among several relational databases, dimensional databases, and/or other data sources. Embodiments are not limited to any number or types of data sources. In some embodiments, the data of data store 120 may include files having one or more of conventional tabular data, row-based data, column-based data, object-based data, and the like. Moreover, the data may be indexed and/or selectively replicated in an index to allow fast searching and retrieval thereof. Data store 120 may support multi-tenancy to separately support multiple unrelated clients by providing multiple logical database systems which are programmatically isolated from one another. Furthermore, data store 120 may support colocation of groups of client data.

The architecture 110 may include metadata defining objects which are mapped to logical entities of data store 120. The metadata may be stored in data store 120 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces and other data to allow application 145 to interact with application server 130. The user interfaces of applications 145 may comprise user interfaces suited for reporting, data analysis, enterprise resource functions, document reports, billing, and/or any other functions based on the data of data store 120. Presentation of a user interface as described herein may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may store data (e.g., files, documents, etc.) on the data store in partitions of the data store 120. To do so, the application 145 executing on the client may be configured to request data (e.g., by group and document range) from the data store 120, according to various embodiments.

Many modern computing systems follow a client-server architecture. While the handling of data is performed on an application server, data is persisted in databases which are usually hosted on a different physical computer. For quick response times expected by the end-user of such a system, fast access of the application to the data is essential. Data access time can be improved if all relevant data is kept in the main memory of the database server, but if the system contains more data than a single server can hold, the data must be split and distributed among different servers, also referred to as database nodes.

A database system typically stores data in tables. Tables can be split according to one or more criteria, which is referred to as partitioning. The parts of a table split by one criteria may be referred to as partitions. If the table is split by more than on criterion the parts of a partition may be referred to as sub-partitions. This type of partitioning is referred to as two-dimensional partitioning as the number of split criterions define the dimensions of partitioning. Each of the created partitions or sub-partitions may store a subset of data in a way that no data is contained in more than one partition or sub-partition. If the database is distributed over different server nodes, each partition can be placed on any of the server nodes. Sub-partitions of a partition may reside always on the same server. In some cases, data from different tables (or partitions from different tables) needs to be combined (e.g., joined, etc.) for processing. The combination can be handled faster if the involved partitions reside on the same database node. Therefore, the database may store data which logically belongs together on the same server. For example, personal data of a customer such as name and address, as well as other information such as orders and bills may belong together. On the other hand, name and address of client A have nothing to do with the same data of customer B and hence customer A and customer B can be kept on different servers. This type of grouping is referred to as sharding.

According to various embodiments, the partitioning structure of the database may include a two-dimensional arrangement of sub-partitions in which shard identifiers are mapped to a first dimension and unique ranges of data identifiers are mapped to a second dimension creating a 2D array of cells (sub-partitions). According to various embodiments, the partitioning structure of the database may be referred to as unbalanced partitioning of the plurality of group partitions that does not create sub-partitions for a large number of data identifier ranges thereby making data access quicker and more efficient. If on the contrary all sub-partitions are created it is referred to as balanced partitions. In this example, a plurality of sub-partitions may be allocated for use based on a diagonal pattern of the plurality of sub-partitions across the two-dimensional arrangement. This is referred to as symmetric balanced partitions. However, it should be appreciated that the diagonal pattern is merely one example, and any asymmetric pattern may be implemented.

Objects or data in tables are usually identified by a unique combination of data identifiers, the latter may be numbers, a combination of characters and numbers, and the like. This unique combination of data identifiers is commonly referred to as primary key or data record identifier. While inserting data records into a table, the database must check its uniqueness. Because there is no relation between a data identifier and a shard identifier, the database must perform this unicity check over all partitions on every server in the balanced partition examples of FIGS. 3A and 3B.

As described herein, a shard is a group of data which can be independently placed on any database node in a database environment consisting of different servers. A shard may include a defining object from which the shard can be derived and dependent objects may inherit the shard assignment through the leading objects. While the leading objects can be assigned arbitrarily to shards the dependent objects must inherit their dependency from the leading object. Leading objects may be persons (customers, employees, etc. . . . ) or technical objects (buildings, machinery . . . ) or others. Dependent objects can be any object assigned to the leading objects like documents (bills, orders, service tickets) or objects somehow directly connected to it (like properties, parts, etc.)

Figure 2:
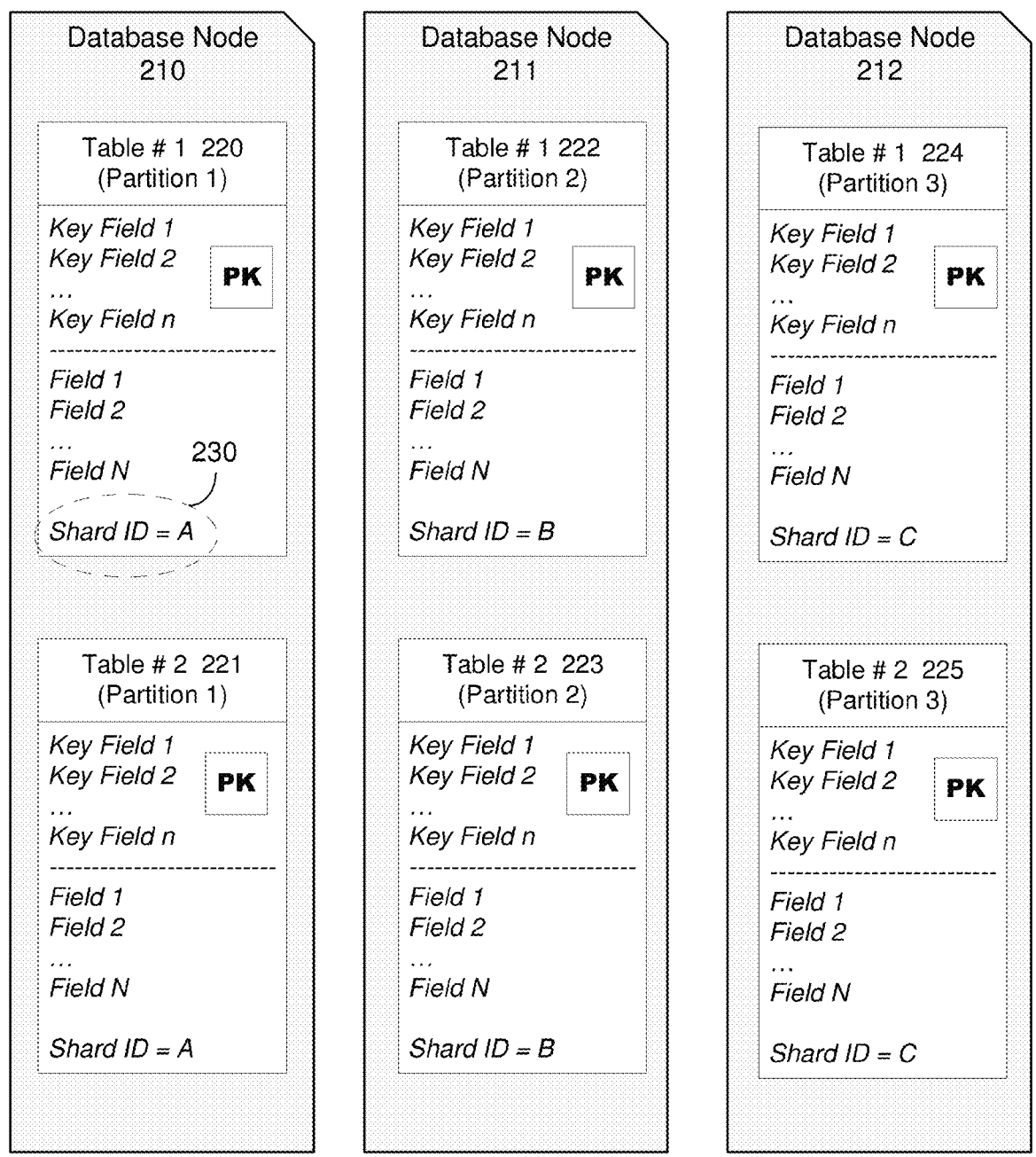
FIG. 2 is a diagram illustrating a database implementing sharding in accordance with an example embodiment.

FIG. 2 illustrates a database 200 implementing sharding in accordance with an example embodiment. Referring to FIG. 2, to enable sharding a shard-identifier 230 may be used which can be added as a field to all partitions tables 220-225 that are distributed over different servers 210-212. Tables are partitioned according to the shard-identifier and partitions of the same table with different shard-identifiers may (but are not required to) reside on different database nodes while partitions of different tables with the same shard-identifier may reside on the same server node. In the example of FIG. 2, the first database node 210 includes a first table partition 220 of a table formed of partitions 220, 222 and 224 and a second table partition 221 which is part of the table formed of partitions 221, 223 and 225. Each table partition includes a common shard identifier 230. Here, the common shard identifier 230 may be assigned to a common client, application, user, etc. By co-locating partitions of different tables on a single database node, the sharding can improve join operations because data can be found at one location rather than dispersed among multiple database locations In this example, the table partitions 220-225 refer to objects that hold data required for application processing. The table description is referred to as a table meta data while the content of the table is referred to as table data. A partition of the database is a portion of a table holding a subset of data. Each data record may be kept in only one partition. Also, a data record identifier is a unique identifier assigned to every object kept in database tables. Tables may contain objects which may include files, blocks, etc. A shard identifier is assigned to every object kept in database tables.

The example embodiments are directed to a database that implements an unbalanced partitioning to provide for faster access to sub-partitions of data files and to provide a mechanism for easily joining together master data and documents of a client application. The unbalanced partitioning scheme may include a two-dimensional (2D) scheme in which a shard is identified as a first layer (first dimension) and a unique range of data identifiers (e.g., file identifiers) as a second layer (second dimension) creating a two-dimensional array of cells which may be referred to as sub-partitions. The database may provide storage for multiple groups of data within the same database area referred to as sharding. For example, an application may master data, document data, user data, and the like, at a same database node within a database system including multiple database nodes. Accordingly, both master data and document data (or some other type of data) may be located together on the database node.

To enable the unbalanced partitioning, the application may be assigned a shard identifier. The shard identifier may be mapped to a specific partition among a plurality of partitions on the database. When a request is received from the application, the request may include the shard identifier which identifies the partition of the database associated with the application. However, the application does not need to know what ranges of data identifiers are assigned to the application. Instead, the application may retrieve a next data identifier from an index that may be stored at the database or at the application server. When the database receives the request from the application, the shard identifier may be used to identify the partition, and the unbalanced partitioning scheme may be used to identify the range of data identifiers allocated to the application. Before the data record can be inserted in the partition, the database needs to determine whether the data identifier has been previously allocated to another data record. Here, the database may perform a unicity check on only the one identified partition instead of all possible partitions because of the unbalanced partitioning. When the data identifier is determined as being not used, the database may store the data record at the identified partition.

Within the two-dimensional unbalanced partitioning scheme, ranges of data identifiers may be created uniquely among a plurality of partitions. That is, rather than all ranges of data identifiers being created for each partition, the partitioning scheme may be unbalanced in that only a unique range (e.g., mutually exclusive, etc.) or ranges of data identifiers may be created for each partition among the plurality of partitions such that no two partitions have overlapping ranges of data identifiers. For the other ranges of data identifiers not allocated to a partition, these ranges may not be created and are otherwise not available.

An application (or application server) may be configured with or otherwise provided its shard identifier. When the application requests to store new document and/or master data, or attempts to access previously stored document and/or master data, the application may provide its shard identifier to the database. Because both the master data and the document data are stored on the same database node, the system does not need to search other database nodes. The data can be identified based on the shard identifier. Furthermore, because the tables are partitioned by shard identifiers in the first layer, the database does not need to search for the data records in any other partition that is not associated with the shard identifier of the application. Furthermore, because the partition includes a unique range of data identifiers, only the unique range of the identified partition needs to be checked to determine if the data identifier is available rather than all possible partitions. The result is a significantly faster database access scheme.

Figure 3A:
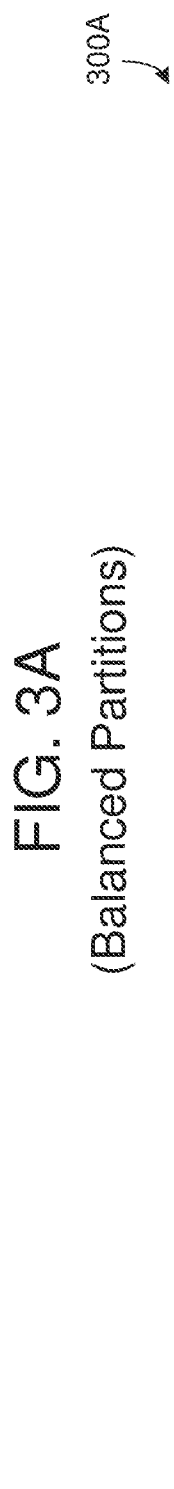
FIGS. 3A-3B are diagrams illustrating balanced partitions of a database in accordance with example embodiment.
Figure 3B:
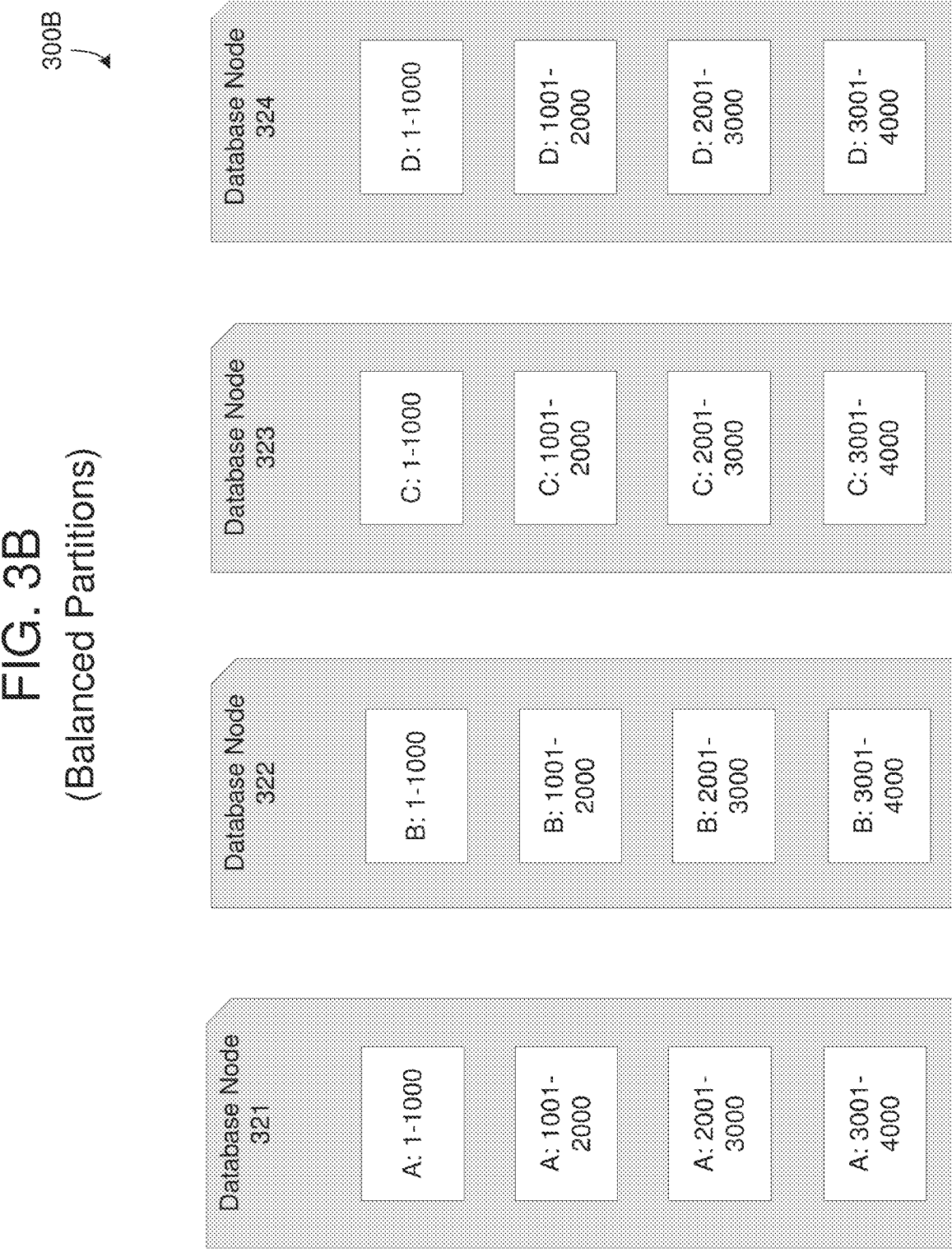

FIG. 3A illustrates a balanced partitioning scheme 300A in accordance with an example embodiment. FIG. 3B further illustrates the partitioning scheme in which shards A, B, C, and D, are designated to a database node 321-324, respectively. Referring to FIGS. 3A and 3B, shards can be logically associated with ranges of data identifiers through a two-dimensional arrangement based on shard identifiers 302 with respect data identifiers 304. Each combination of shard identifier and data identifier range creates a sub-partition 310 which can be used to store data. In these examples, each shard is logically associated with each range available. Accordingly, when data access occurs with respect to any of the tables, the database will receive a data identifier from the application. For example, the database may receive a data identifier of '1001'. Because all shards A, B, C, and D, are logically associated with the data identifier '1001, the database must look up and perform a unicity check on each database node 321, 322, 323, and 324, holding each of the shards as shown in the database partitioning scheme 300B of FIG. 3B. Only after each database node is checked can the new data record be safely stored. As will be appreciated, the unicity checks are very expensive to the database and cause performance degradation because they consume valuable network resources, processing power, time, and the like.

Figure 4A:
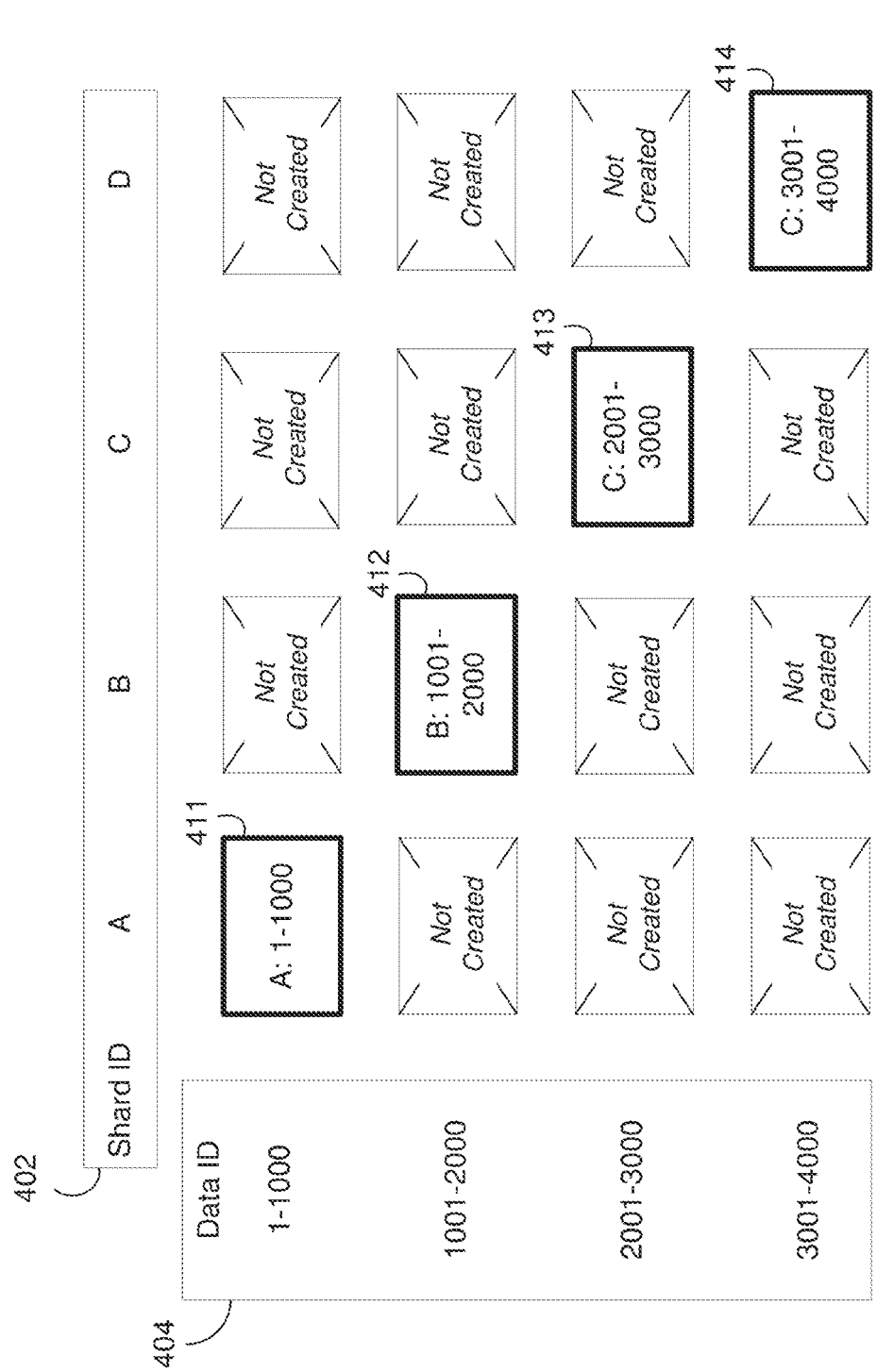
FIGS. 4A-4C are diagrams illustrating unbalanced partitions in a database, in accordance with example embodiments.
Figure 4B:
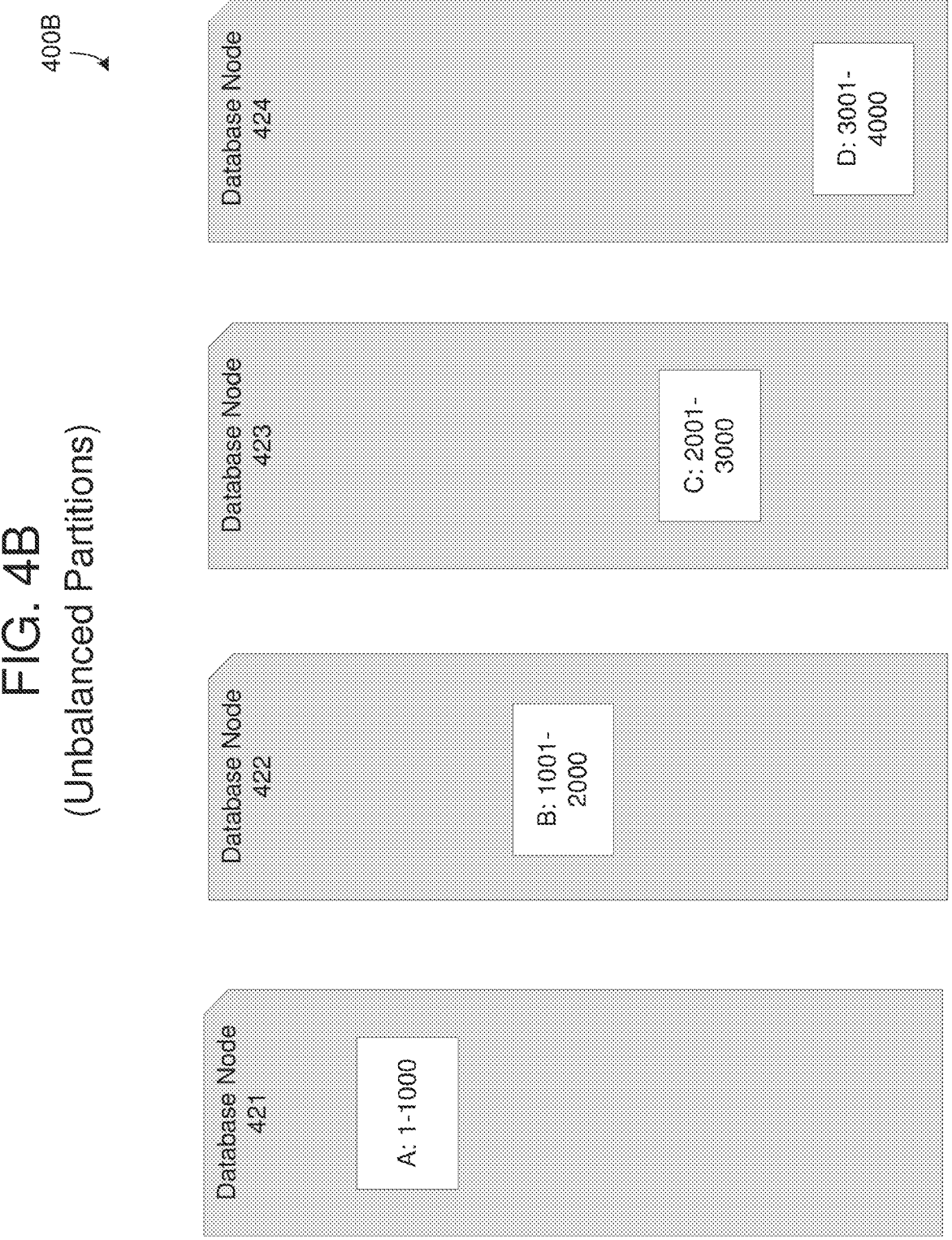
Figure 4C:
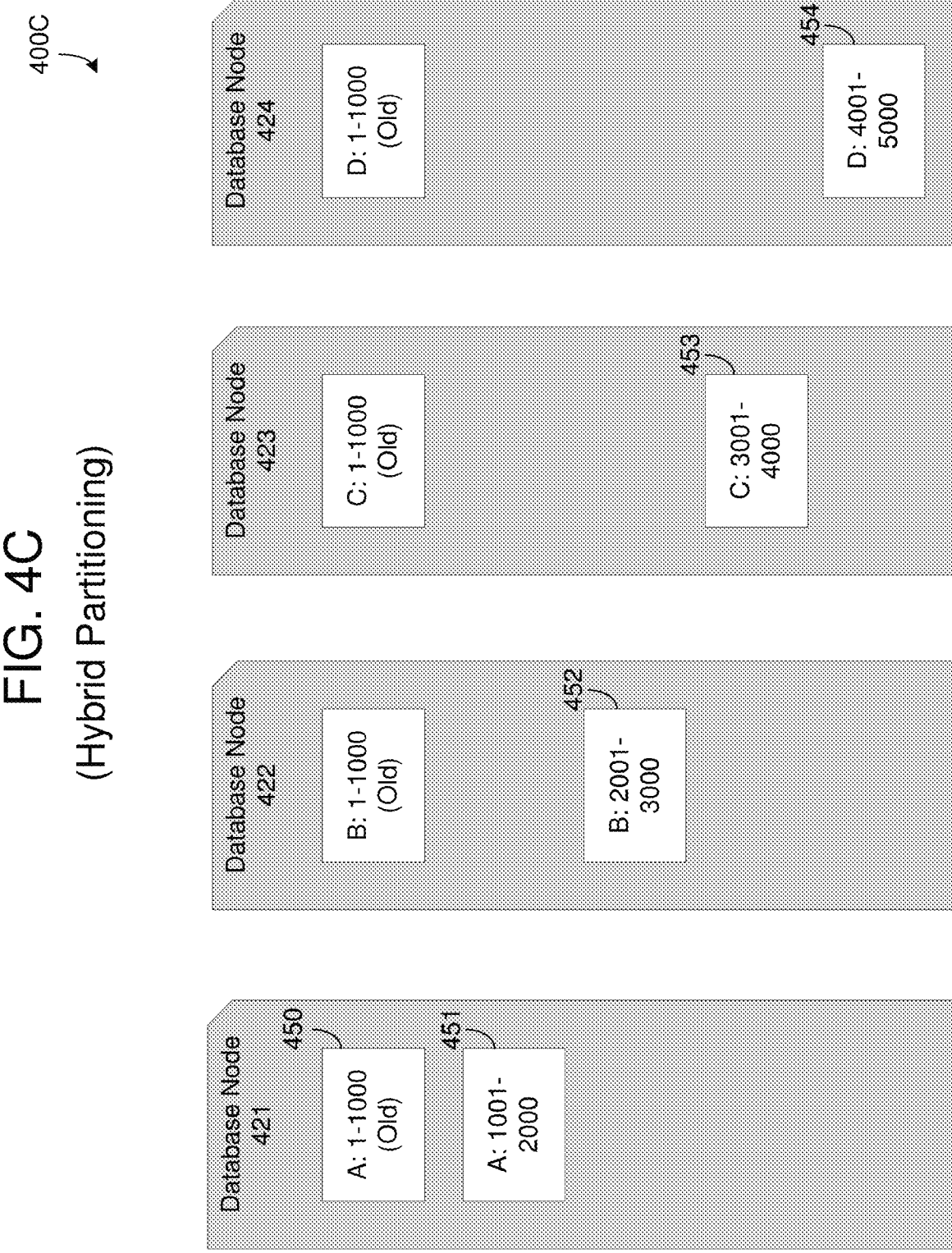

The example embodiment improves upon these issues through a technical solution implemented by unbalanced partitions in contrast to balanced partitions. Unbalanced partitions result from unique partitions of data being designated to each shard and each database node. For example, FIGS. 4A-4C illustrates examples of unbalanced partitions in a database, in accordance with example embodiments. FIG. 4A illustrates a two-dimensional unbalanced partitioning scheme 400A in which different (and mutually exclusive) data identifiers are created for each shard among a plurality of shards. For example, the system may logically split data identifiers into sub-ranges and assign each sub-range exclusively to one shard-identifier within the application. The database may be unaware of the logical split and hence cannot make use of this information. Whenever the application requires a new (unused) data identifier, the application may choose a next available data identifier from the range assigned to the shard identifier of the given application. Further, a two-dimensional partitioning on every table with shard identifier 402 as first level and data identifier 404 as second level partition.

Only sub-partitions are created (411, 412, 413, and 414) that correspond to a valid shard identifier and data-identifier combination. Meanwhile, sub-partitions with an invalid combination are not created. This is referred to as unbalanced partitions. As one example, each shard identifier may be assigned to exactly one data-identifier range, but embodiments are not limited thereto and each shard identifier may be assigned multiple unique data identifier ranges. When an application tries to insert an invalid combination of shard identifier/data identifier, the database will not find a suitable sub-partition for the combination and will refuse insert. On the other hand, if a valid combination is given, only one sub-partition exists and hence the uniqueness check of the primary key is only performed for the target sub-partition.

FIG. 4B illustrates an unbalanced database scheme 400B in which each database node 421, 422, 423, and 424, is assigned a unique (and mutually exclusive) range of data identifiers of the database. Remaining sub-partitions are not generated for the database nodes other than those with uniquely assigned ranges. When an application submits request to insert a new data record into the database, the system may first identity a shard identifier from the request. Next, the system may identify whether a partition exists for the shard identifier from table metadata. The table metadata may indicate which partition the shard identifier is associated with. When the shard identifier is determined to be associated with the partition, the system performs a second level check to determine whether a data identifier included in the request is available within the partition (i.e., within the range of data identifiers uniquely assigned to the partition). When the data identifier is available, the system may store the data record.

However, for system with already existing data it is not possible to create the described fixed assignment between data and data-identifier such that all data identifier with the same shard identifier can be stored in the same table partition. This is because previously no shard-identifier existed and consequently there was no fixed assignment between shard identifier and data identifier range such as shown in the example of FIG. 4C. In this asymmetric scheme 400C, old data (previously stored) may be commonly stored within a sub-partition 450 among each partition. In this example, each partition includes old data between data identifier 1-1000. Meanwhile, new data may only be stored within unique sub-partitions 451, 452, 453, and 454. The new scheme may be implemented within the later ranges, while retaining the old data and the old access. Furthermore, the old data and old data identifiers may no longer be used to store new data records.

Figure 5:
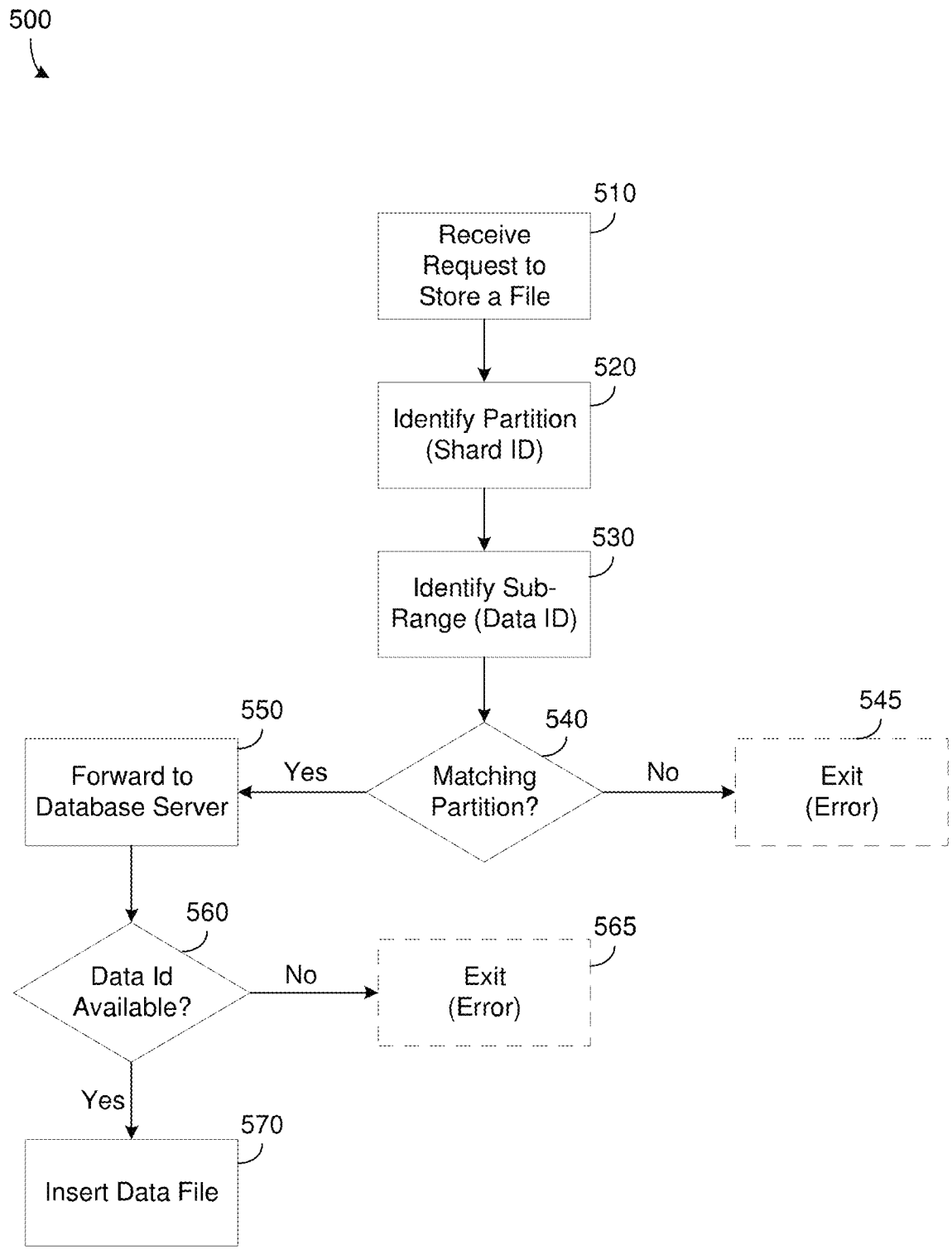
FIG. 5 is a diagram illustrating a process of inserting a data file in an unbalanced partition, in accordance with an example embodiment.

FIG. 5 illustrates a process 500 of inserting a data record in an unbalanced partition of a database, in accordance with an example embodiment. For example, the process 500 may be performed by a database. Referring to FIG. 5, in 510 the process may include receiving a request to store a data record at a database. The request may be received from an application (application server) and may identify a shard associated with the application based on a shard identifier. In 520, the process may identify the shard associated with the request based on the shard identifier included in the request, and in 530, the process may identify a data identifier based on a data identifier included in the request.

In 540, the process determines whether or not a matching sub-partition exists for the given combination of shard identifier and data identifier based on metadata of the partitions (table metadata). For example, each partition may identify which shard it is dedicated to. If the partition is not identified from table metadata, the database may exit and return an error indicating the client application has requested improper access, in 545. However, if the matching partition is identified in 540, the database may forward the request to a corresponding database server associated with the partition, in 550. Next, the database server may perform a unicity check on a unique range of data identifiers dedicated to the partition, in 560. If the data identifier is not available, in 565, the database may return an error and exit. If the data identifier is available, in 570, the database may store the data file at the corresponding data partition of the database server.

Figure 6:
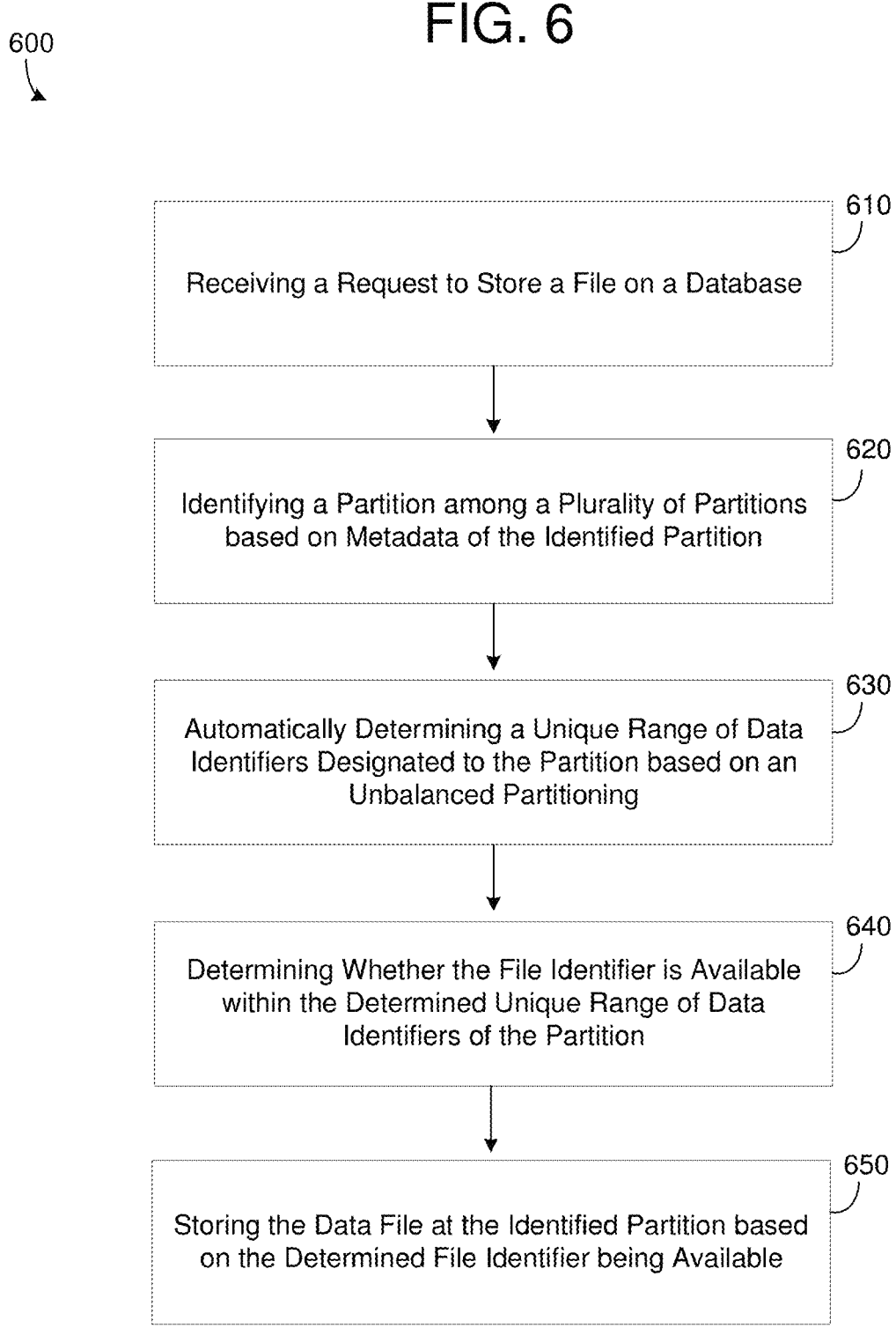
FIG. 6 is a diagram illustrating a method for inserting a data file in an unbalanced partition, in accordance with an example embodiment.

FIG. 6 illustrates a method 600 for inserting a data file in an unbalanced partition, in accordance with an example embodiment. As an example, the method 600 may be performed by a database node included within a distributed database system. As another example, the method 600 may be performed by a computing device such as a server, a cloud platform, a user device, an on-premises server, and the like. In some examples, the method 600 may be performed by a plurality of devices in combination. Referring to FIG. 6, in 610, the method may include receiving a request to store a data record at a database. As another example, the method may include receiving a request to access a data record from the database. The request may identify a particular partition associated with the application making the request from among a plurality of partitions of the database system. The request may also identify a data identifier of a data record that is to be stored. As a non-limiting example, the data record may include a document (e.g., record, table, file, etc.) for storage on the database. As another example, the data record may include a table, a data object, or the like.

In 620, the method may include identifying a partition from among a plurality of partitions of a database based on a shard identifier in the request. For example, each shard may be uniquely allocated to one partition among the plurality of partitions. Furthermore, the application requesting insert of the data record may be configured with the knowledge of the shard identifier.

In 630, the method may include automatically determining a unique range of data identifiers designated to the sub-partition from the plurality of sub-partitions, respectively, based on an unbalanced partitioning. Each sub-partition may be designated a unique range of data identifiers that are mutually exclusive with the ranges designated to other partitions in the same database. Therefore, the databased only needs to perform a unicity check on a single partition within a single sub-partition when determining whether the data identifier is available.

In 640, the method may include determining whether the data identifier is available within the unique range of data identifiers of the identified partition, and in 650, storing the data record at the identified sub-partition in response to determining the data identifier is available. For example, the data identifier may include a next available document identifier from among the unique range of document identifiers uniquely allocated to the identified partition. In some embodiments, the data identifier may exist only once in the database based on a combination of the identified shard identifier and the unique range of data identifiers allocated to the partition. In some embodiments, the determining in 640 may include performing a unicity check on the identified sub-partition to determine if the data identifier has been previously allocated to another data record stored in the identified sub-partition.

Figure 7:
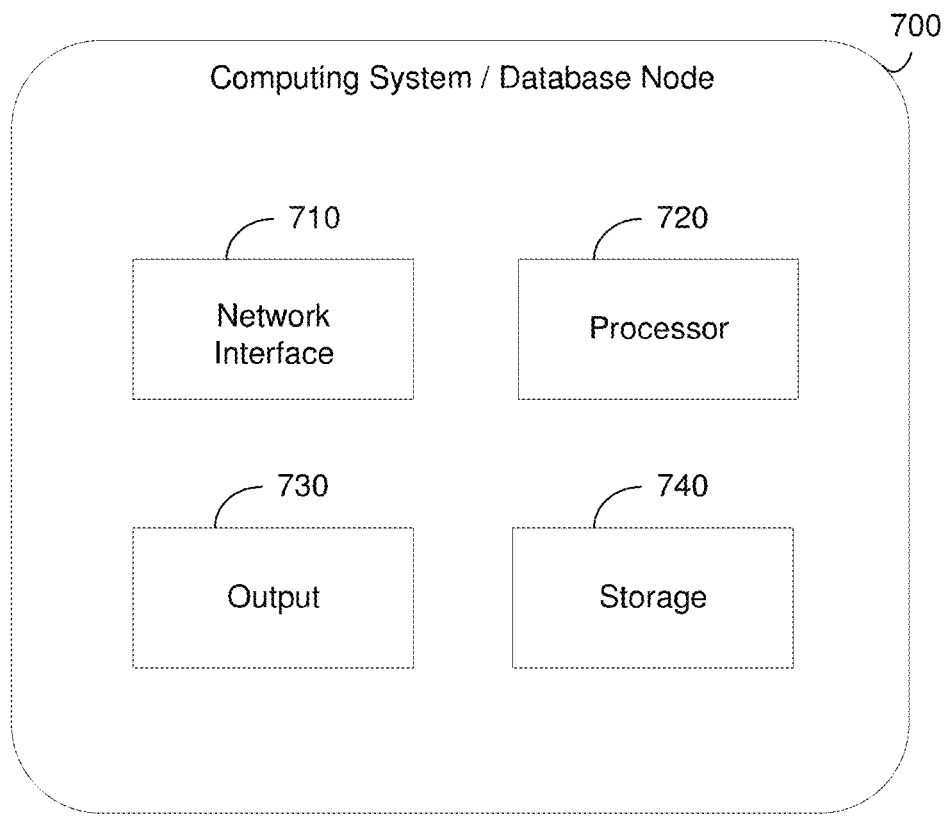
FIG. 7 is a diagram illustrating a computing system in accordance with an example embodiment.

FIG. 7 illustrates a computing system 700, in accordance with an example embodiment. For example, the computing system 700 may be a database node, a server, a cloud platform, a user device, or the like. In some embodiments, the computing system 700 may be distributed across multiple devices. Referring to FIG. 7, the computing system 700 includes a network interface 710, a processor 720, an output 730, and a storage device 740 such as an in-memory. Although not shown in FIG. 7, the computing system 700 may also include or be electronically connected to other components such as a display, an input unit, a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 1000, an externally connected display, a display connected to the cloud, another device, and the like. For example, the output 730 may include a port, an interface, a cable, a wire, a board, and/or the like, with input/output capabilities. The network interface 710, the output 730, or a combination thereof, may interact with applications executing on other devices.

The storage device 740 is not limited to a particular storage device and may include any known memory device such as RAM, ROM, hard disk, and the like, and may or may not be included within the cloud environment. The storage 740 may store software modules or other instructions which can be executed by the processor 720 to perform the method 600 shown in FIG. 6. According to various embodiments, the storage 740 may store database files and may have a partitioning scheme as shown or described in the examples herein. The storage may include a data store having a plurality of tables, partitions and sub-partitions.

According to various embodiments, the processor 720 may receive a request to store a data record. The request may include a shard identifier of a shard assigned by the application sending the request. The request may also include a data identifier (e.g., a next available data identifier) known to the application. The most recently-used data identifier may be stored in an index on the server or at the application, and may be checked by the application when sending a request to store a data file. The processor 720 may identify a partition from among the plurality of partitions based on the shard identifier in the request. Here, each shard may be uniquely dedicated to one partition among the plurality of partitions.

According to various embodiments, the processor 720 may automatically determine a unique range of data identifiers designated to the identified sub-partition from the plurality of sub-partitions, respectively, based on an unbalanced partitioning. Here, each sub-partition may be uniquely assigned a range of data identifiers from the totality of data identifiers. Furthermore, the processor 720 may determine whether the data identifier in the request is available within the unique range of data identifiers of the identified sub-partition. For example, the processor 720 may perform a unicity check on only the identified sub-partition at the uniquely allocated range of data identifiers to determine whether the data identifier is available or has already been taken, rather than all of the partitions. Furthermore, the processor 720 may store the data record at the identified sub-partition in response to determining the data identifier is available.

In some embodiments, the partitioning structure of the data store in storage 740 may include a two-dimensional arrangement of partitions and sub-partitions in which shard identifiers are mapped to a first dimension and unique data identification ranges are mapped to a second dimension. In this example, a plurality of partitions may be dedicated to the plurality of shards, respectively. The partitions may be allocated for use based on a diagonal pattern (symmetric unbalanced partitioning) within the two-dimensional arrangement of the data store. In some embodiments, the partitioning structure of the data store comprises an asymmetric unbalanced partitioning of the plurality of group partitions such that different ranges of data identifiers are uniquely allocated to each respective partition.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a data store; and
    a processor configured to
        map a plurality of shard identifiers corresponding to a plurality of partitions of a database to a plurality of columns within a two-dimensional data structure stored in the data store and map a plurality of non-overlapping ranges of data identifiers to a plurality of rows in the two-dimensional data structure in the data store, where each shard identifier among the plurality of shard identifiers is designated a different non-overlapping range of data identifiers within the two-dimensional arrangement; and
        receive a request to store a data record comprising a shard identifier and a data identifier assigned by the database to the data record,
        determine that a partition exists for the shard identifier from table metadata of the plurality of partitions,
        in response to determining that the partition exists for the shard identifier, identify a column within the two-dimensional data structure which is mapped to the shard identifier based on the mapping of the plurality of shard identifiers to the plurality of columns within the two-dimensional data structure and identify a row with a range of data identifiers designated to the partition based on the mapping of the plurality of different non-overlapping ranges of data identifiers to the plurality of rows within the two-dimensional data structure, and
        execute a unicity check for the data identifier in the request on only the non-overlapping range of data identifiers designated to the partition within the identified row of the two-dimensional data structure to determine whether the data identifier is available within the partition,
    wherein the processor is further configured to store the data record at the partition in response to determining the data identifier is available.

2. The computing system of claim 1, wherein the processor is further configured to perform the unicity check on only one database node corresponding to the shard identifier from among a plurality of database nodes corresponding to the plurality of shard identifiers to determine if the data identifier is already assigned to another data record stored in the partition.

3. The computing system of claim 1, wherein the two-dimensional data structure comprises a two-dimensional array of cells that correspond to the plurality of rows of non-overlapping ranges of data identifiers designated to the plurality of columns corresponding to the plurality of shard identifiers.

4. The computing system of claim 3, wherein the processor is configured to assign the plurality of non-overlapping ranges of data identifiers to a plurality of different shard identifiers to create a diagonal pattern of cells with mapped non-overlapping ranges of data identifiers in the two-dimensional data structure.

5. The computing system of claim 3, wherein ranges of data identifiers that are designated to shard identifiers of other partitions among the plurality of partitions are not created for the shard identifier within the two-dimensional arrangement.

6. The computing system of claim 1, wherein the plurality of partitions are stored on a plurality of database nodes respectively, with each database node corresponding to a unique shard identifier and storing only one partition.

7. The computing system of claim 6, wherein a first database node from among the plurality of database nodes comprises a different type of storage structure than a second database node from among the plurality of database nodes.

8. The computing system of claim 1, wherein the data identifier comprises a next available data identifier within the non-overlapping range of data identifiers designated to the partition.

9. A method comprising:
    mapping a plurality of shard identifiers corresponding to a plurality of partitions of a database to a plurality of columns within a two-dimensional data structure stored in a data store and mapping a plurality of non-overlapping ranges of data identifiers to a plurality of rows in the two-dimensional data structure in the data store, where each shard identifier among the plurality of shard identifiers is designated a different non-overlapping range of data identifiers within the two-dimensional arrangement;
    receiving a request to store a data record, where the request comprises a shard identifier and a data identifier assigned by the database to the data record;

determining that a partition exists for the shard identifier from table metadata of the plurality of partitions;

in response to determining that the partition exists for the shard identifier, identifying a column within the two-dimensional data structure which is mapped to the shard identifier based on the mapping of the plurality of shard identifiers to the plurality of columns within the two-dimensional data structure and identifying a row of a range of data identifiers designated to the partition based on the mapping of the plurality of different non-overlapping ranges of data identifiers to the plurality of rows within the two-dimensional data structure;

executing a unicity check for the data identifier in the request on only the non-overlapping range of data identifiers designated to the partition within the identified row of the two-dimensional data structure to determine that the data identifier is available within the partition; and storing the data record at the partition in response to determining the data identifier is available.

10. The method of claim 9, wherein the performing comprises performing the unicity check on only one database node corresponding to the shard identifier from among a plurality of database nodes corresponding to the plurality of shard identifiers to determine if the data identifier is already assigned to another data record stored in the partition.

11. The method of claim 9, wherein the two-dimensional data structure comprises a two-dimensional array of cells that correspond to the plurality of rows of non-overlapping ranges of data identifiers designated to the plurality of columns corresponding to the plurality of shard identifiers.

12. The method of claim 11, wherein the mapping comprises assigning the plurality of non-overlapping ranges of data identifiers to a plurality of different shard identifiers to create a diagonal pattern of cells with mapped non-overlapping ranges of data identifiers in the two-dimensional data structure.

13. The method of claim 11, wherein ranges of data identifiers that are designated to shard identifiers of other partitions among the plurality of partitions are not created for the shard identifier within the two-dimensional arrangement.

14. The method of claim 9, wherein the plurality of partitions are stored on a plurality of database nodes respectively, with each database node corresponding to a unique shard identifier and storing only one partition.

15. The method of claim 14, wherein a first database node from among the plurality of database nodes comprises a different type of storage structure than a second database node from among the plurality of database nodes.

16. The method of claim 9, wherein the data identifier comprises a next available data identifier within the non-overlapping range of data identifiers designated to the partition.

17. A non-transitory computer-readable storage medium storing program instructions that when executed cause a processor to perform a method comprising:

mapping a plurality of shard identifiers corresponding to a plurality of partitions of a database to a plurality of columns within a two-dimensional data structure stored in a data store and mapping a plurality of non-overlapping ranges of data identifiers to a plurality of rows in the two-dimensional data structure in the data store, where each shard identifier among the plurality of shard identifiers is designated a different non-overlapping range of data identifiers within the two-dimensional arrangement;

receiving a request to store a data record, where the request comprises a shard identifier and a data identifier assigned by the database to the data record;

determining that a partition exists for the shard identifier from table metadata of the plurality of partitions;

in response to determining that the partition exists for the shard identifier, identifying a column within the two-dimensional data structure which is mapped to the shard identifier based on the mapping of the plurality of shard identifiers to the plurality of columns within the two-dimensional data structure and identifying a row of a range of data identifiers designated to the partition based on the mapping of the plurality of different non-overlapping ranges of data identifiers to the plurality of rows within the two-dimensional data structure;

executing a unicity check for the data identifier in the request on only the non-overlapping range of data identifiers designated to the partition within the identified row of the two-dimensional data structure to determine that the data identifier is available within the partition; and storing the data record at the partition in response to determining the data identifier is available.

18. The non-transitory computer readable medium of claim 17, wherein the performing comprises performing the unicity check on only one database node corresponding to the shard identifier from among a plurality of database nodes corresponding to the plurality of partitions to determine if the data identifier is already assigned to another data record stored in the partition.

19. The non-transitory computer readable medium of claim 17, wherein the two-dimensional data structure comprises a two-dimensional array of cells that correspond to the plurality of rows of non-overlapping ranges of data identifiers designated to the plurality of columns corresponding to the plurality of shard identifiers.

20. The non-transitory computer readable medium of claim 19, wherein the mapping comprises assigning the plurality of non-overlapping ranges of data identifiers to a plurality of different shard identifiers to create a diagonal pattern of cells with mapped non-overlapping ranges of data identifiers in the two-dimensional data structure.

\* \* \* \* \*